C. H. MANSFIELD.
FILM WINDING ATTACHMENT.
APPLICATION FILED OCT. 9, 1916.
1,327,245.
Patented Jan. 6, 1920.
2 SHEETS—SHEET 1.
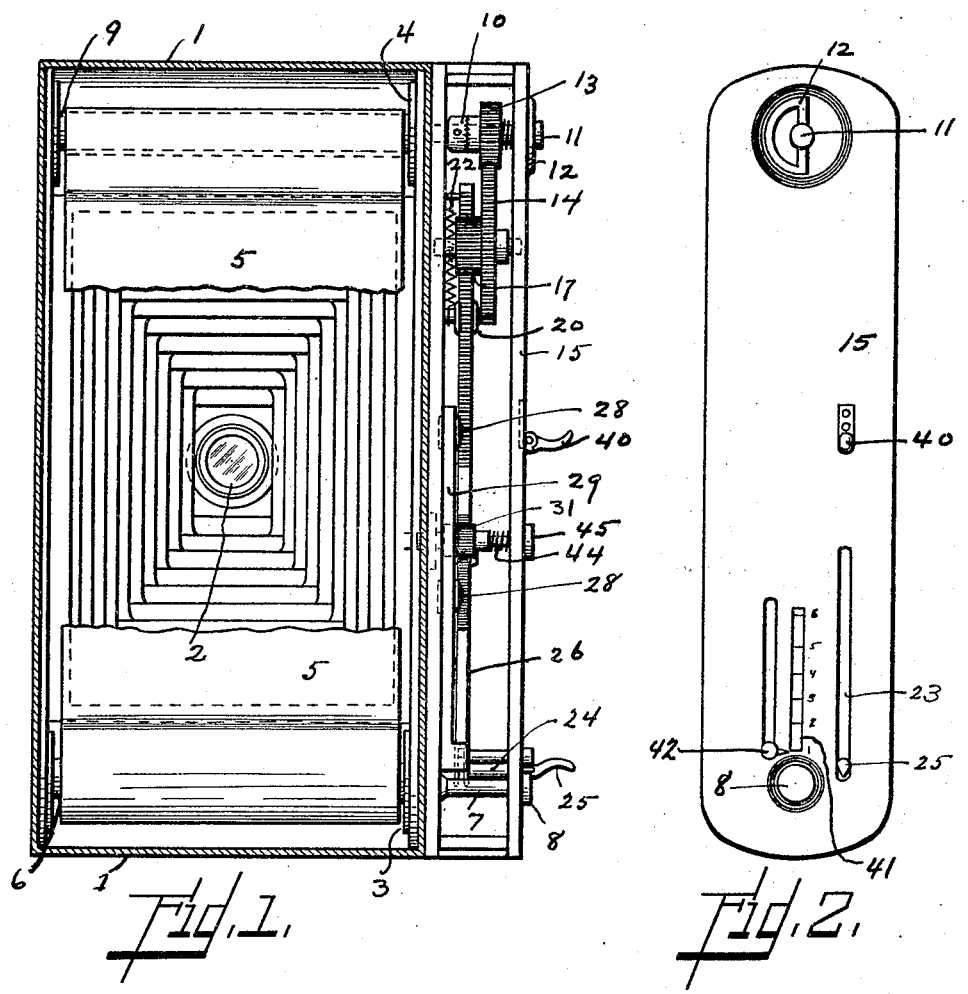
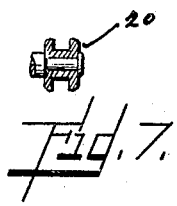
INVENTOR.
C. H. Mansfield
BY
John M. Spellman
ATTORNEY.

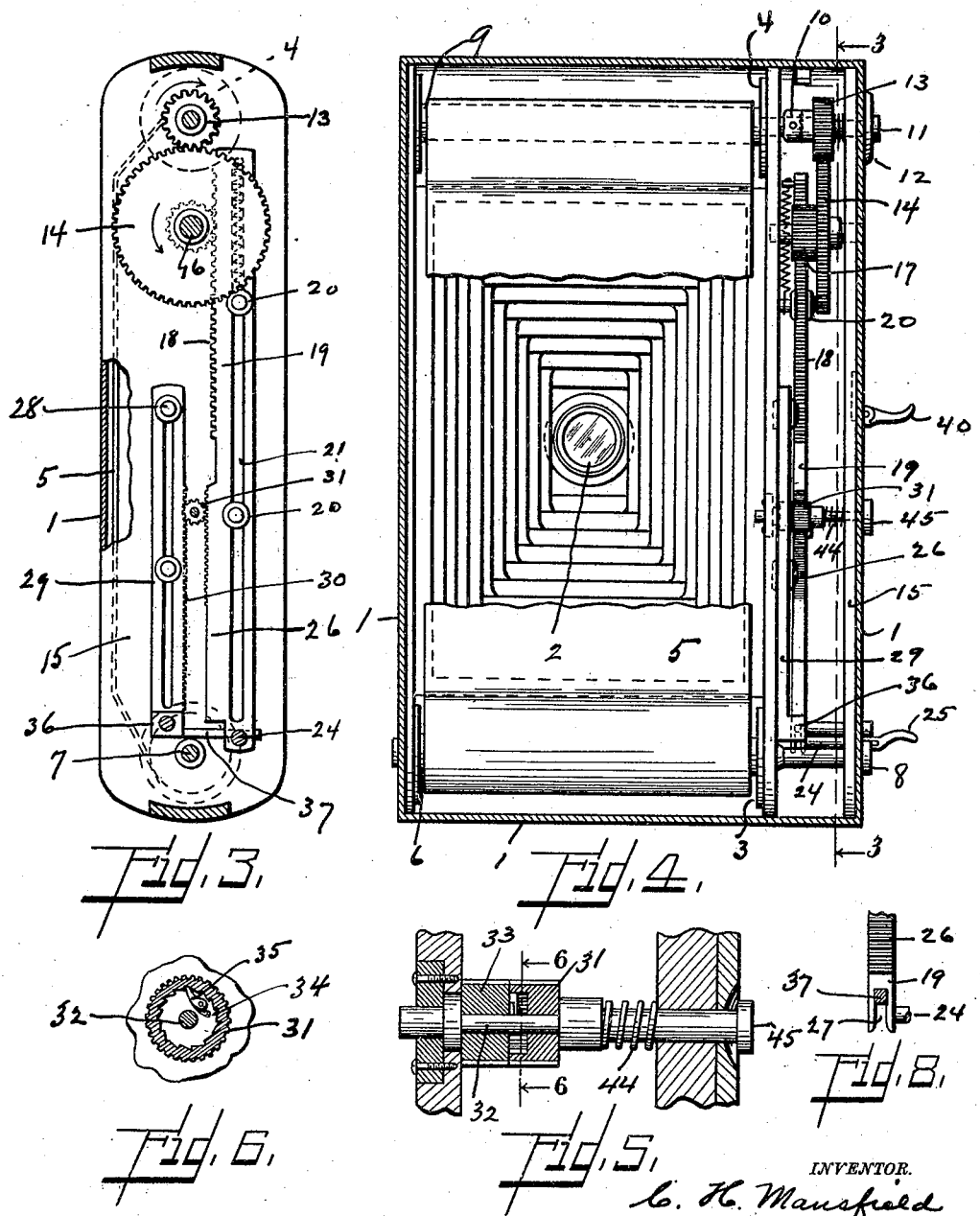

UNITED STATES PATENT OFFICE.

CLARENCE H. MANSFIELD, OF EL PASO, TEXAS.

FILM-WINDING ATTACHMENT.

1,327,245.	Specification of Letters Patent.	Patented Jan. 6, 1920.

Application filed October 9, 1916. Serial No. 124,661.

*To all whom it may concern:*

Be it known that I, CLARENCE H. MANSFIELD, a citizen of the United States, residing at El Paso, in the county of El Paso and State of Texas, have invented certain new and useful Improvements in Film-Winding Attachments, of which the following is a specification.

My invention has relation to an attachment for winding films in a camera and in such connection it relates more particularly to the arrangement and construction of the attachment whereby required portions of film may be successively registered across the lens or film gate of the camera.

Where a long strip of film is unwound from one spool and wound upon another and the spool upon which the film is wound is actuated to take up the required portion of the film to bring successive portions across the field of the lens or across the film gate of a camera, it is obvious that as the film winds up upon the spool the diameter of said spool will increase. Hence care must be exercised in the number of turns to be given to the spool so that said spool will be turned just the proper distance, according to its gradually increasing diameter, to wind up just enough of the film to bring the required portion of film from the other spool across the lens of the camera.

In a former application for patent filed by me under date of April 6, 1916, and Serial No. 89,407 I have described a means for operating the wind up spool which will compensate for the increasing diameter of the spool, said means consisting of a gear wheel for moving the spool in one direction, a rack bar in mesh with said gear wheel and a movable stop controlling the throw or active movement of the rack bar, said stop being coördinated with a scale which indicates the position of the stop for successive actuations of the film winding attachment. In this form of attachment the stop is moved by hand after successive exposures or after successive operations of the rack bar.

It is the main object of my present invention to provide in such attachment a means to couple up the rack bar with the limiting stop so that the operation of the rack bar will automatically bring the stop to the required positions necessary for the successive limitations of the movement of the rack bar. In my present attachment no manual operation of stop *per se* is necessary since the manual operation of the rack bar will control the movement to the successive required positions of the stop.

The nature and scope of my invention will be more fully understood from the following description taken in connection with the accompanying drawings forming part hereof, in which Figure 1, is a vertical sectional view of a film camera embodying the main features of my invention.

Fig. 2, is a side elevational view of the same.

Fig. 3, is a cross-sectional view taken on the line 3—3 of Fig. 4.

Fig. 4, is a vertical sectional view of a camera embodying a modified form of the invention.

Fig. 5, is a detail view, enlarged and sectioned, illustrating the means for connecting the rack bar with the stop pin.

Fig. 6, is a vertical sectional view taken on the line 6—6 of Fig. 5.

Fig. 7, is a detail sectional view of one of the rollers for guiding the rack bar and the stop bar, and Fig. 8, is a detail view illustrating the stop pin and the lower end of the rack bar engaging said pin.

Referring to the drawings 1 represents the casing for the camera, 2 the lens and 3 and 4 the respective spools from and upon which the film 5 is unwound and wound in the presentation of successive portions of the film to the lens 2.

The spool 3 which receives the unexposed film is of the usual character but in the form of the invention illustrated in Figs. 1 and 2 where the attachment is located outside the casing 1 of the camera, the shaft or axis 6 of the spool is extended beyond the side of the casing in the form of a stub shaft 7 furnished with a button 8 for operating the stub shaft 7 and axis 6 of the spool.

The spool 4 which receives the film after exposure to the lens is also of the usual character except that in the form of invention illustrated in Figs. 1 and 2, its axis 9 is extended from one side of the camera in the form of a clutch or ratchet 10 connecting the axis 9 with a stub shaft 11 operated by the turn button 12.

On the stub shaft 11 is secured a pinion 13 meshing with a gear wheel 14. The extensions of axis 6 and of axis 9 have bearings in a box 15 which incloses the operating mechanism for pinion 13 and gear 14.

The gear 14 has a shaft 16 turning in the walls of box 15 and on this shaft 16 is secured a pinion 17 meshing with a rack 18 carried by the bar 19. This bar 19 is guided by rollers 20 working in a slot 21 of the bar 19. A spring 22 connecting the top of the bar 19 with the shaft of the upper of the rollers 20 serves to normally lower the rack and bar.

The outer face of the box 15 is slotted as at 23 and through this slot 23 extends a pin 24 connected rigidly to the lower end of the rack bar 19. The free end of pin 24 is hook shaped as at 25, the hook 25 extending beyond the outer face of the box 15.

The rack bar 19 is guided by its rollers 20 some distance from the inner wall of box 15 and at its lower end is provided with a second rack 26 the teeth of which are arranged much closer together than are the teeth of rack 18. The extreme lower end of the bar 19 is slotted as at 27.

To one side of rack bar 19 and guided by rollers 28 projecting from the inner wall of box 15 is a bracket 29 having on the edge facing the rack 26 of bar 19 a rack 30 the teeth of which are fine and corresponding with the teeth of said rack 26. The rack 26 is in mesh with a pinion 31 turning loosely on a shaft 32 and the rack 30 is in mesh with a second pinion 33 loose on said shaft 32. The two pinions 31 and 33 are arranged to revolve together only upon the down or return stroke of rack bar 19 and a simple way to accomplish this connection between the two pinions 31 and 33 is illustrated in Fig. 5. It consists in forming in the interior of pinion 31 a ratchet 34 operated by a spring pawl or detent 35 carried by the contiguous face of pinion 33.

The bracket 29 is provided at its lower end with an extension 36 carrying a stop pin 37 projecting into the path of the rack bar 19 and engaging its slotted lower end (see Fig. 8) to stop the downward movement of said bar 19 under tension of the spring 22.

The teeth of the racks 26 and 30 are so proportioned with regard to the teeth of rack 18 and the pinions or cogs 31 and 33 are so proportioned in diameter with the pinion 17 that when the rack bar 19 descends after being advanced to wind up the spool 4, the bracket 29 is elevated the proper distance to properly limit through its stop pin 37 the downward descent of the hook 25 attached to said rack bar. The hook 25 coöperates with a stationary hook 40 on the outside of the camera in such manner that when the two hooks are grasped between the fingers the hook 25 and pin 24 are drawn upward in slot 23 toward the hook 40. This upward movement of hook 25 is of course limited by the upper end of slot 23 or may be adjusted irrespective of the slot 23 when said slot 23 extends farther upward than the normal upward movement of the hook 25 by means of the intermediate roller 20 which impinges on the lower edge of slot 21 of bar 19.

The movement upward of bracket 29 may be indicated upon a scale 41 on the outside of box 15 by attaching a pointer 42 to the bracket and permitting it to ride in a slot 42 of the outer wall of box 15 adjacent to the scale 41. The scale 41 also serves to indicate the number of the exposure say from 1 to 12.

The distance over which the bracket 29 with its rack 30 moves upon each complete stroke of the rack bar 19 depends upon the number of teeth in rack 26 which engage the pinion 31.

When all portions of the film have been exposed and the bracket 29 has been advanced by successive stages to its uppermost position, the device may be reset as follows:

The shaft 32 with its two pinions 31 and 33 may be pulled outward against the tension of spring 44 by drawing out the head 45 of said shaft 32 as clearly illustrated in Fig. 5. When the shaft is so pulled or drawn outward, the pinion 33 will clear the rack 30 in bracket 29 and said bracket either falls by gravity, or may be drawn down by pulling on the pointer 42, to its initial position. The rack bar 19 is then free under tension of its spring 22 to move to its lowermost or initial position. When the bar 19 and bracket 29 are so restored to initial position, the shaft 32 is released and its spring 44 forces the shaft inward to bring the cogs or pinions 31 and 33 in mesh with their respective racks.

In Figs. 3 and 4 the construction of parts is identical with those shown in Figs. 1 and 2, the only change being one of location. In Figs. 3 and 4 the box 15 is inclosed in the casing 1 whereas in Figs. 1 and 2 the box 15 is located outside said casing.

I have discovered that, in the winding up of the film upon the spool 4 after the first or initial exposure of the film, a substantially accurate limitation of succeeding upward movements of rack bar 19 to secure proper winding up of successive portions of exposed film may be secured by the arrangement shown in the drawings, namely,—

The toothed portion 26 of bar 19 is of such length or rather its teeth are formed to such an extent on the bar 19 above the point where pinion 31 normally engages these teeth on the downward movement of bar 19, that on the downward movement of bar 19, say for instance after an upward movement of one and one-half inches the bar 19 moves only one-half the distance it had previously been moved upward, that is to say, three-quarters of an inch. The next movement upward of bar 19 would be three-quarters of an inch and downward movement of three-eighths of an inch, and so on.

The control of this limited downward movement results from the upward movement of bar 29 when pinions 31 and 33 are properly in mesh with their respective racks. If for any reason it is found that pinion 31 remains too long in mesh with its rack on the downward movement, certain of the teeth 26 on the lower end of the racks are cut off to compensate for this excess movement of pinion 31. In other words, if required the rack bar 19 may move downward some distance on its return stroke before the pinion 31 begins to engage the teeth 26.

In the drawings the relative arrangement shown is approximately that required in a camera having six films.

Having thus described the nature and objects of my invention, what I claim is,—

1. In a film winding attachment, a spool upon which the exposed portions of the film are to be wound, a gear mechanism for driving said spool, a bar having a rack at one end in mesh with one of the gears of the mechanism, an operating pin secured to the rack bar, a second rack formed on said bar at or near its lower end, a movable bracket having a rack adjacent to the lower rack of the bar, a means connecting the two oppositely disposed racks and arranged to permit only of the elevation of the bracket during the downward movement of the rack bar and a stop pin carried by the bracket and arranged to limit the downward movement of said rack bar.

2. In a device of the character described a rack bar arranged to actuate said device when advanced in one direction, a sliding bracket arranged to limit the return movement of said rack bar and means connecting the rack bar and bracket, and arranged so that upon the successive return movements of the rack bar said bracket will be successively advanced to thereby limit the return movement of the rack bar to successive prescribed positions.

3. In a device of the character described a rack bar arranged to actuate the device when advanced in one direction, a spring arranged to return the rack bar, a movable stop for limiting the return movement of said rack bar and a means connecting the rack bar with said stop and arranged to automatically shift the stop to successive limiting positions during successive return movements of the rack bar.

4. In a device of the character described a rack bar arranged to actuate the device when advanced in one direction, a spring arranged to return the rack bar, a movable stop for limiting the return movement of said rack bar and a means connecting the rack bar with said stop and arranged to automatically shift the stop to successive limiting positions during the successive return movements of the rack bar, in combination with mechanism for disconnecting the stop from the rack during the resetting of the device.

In testimony whereof I have signed my name to this specification.

CLARENCE H. MANSFIELD.